June 10, 1941.　　　O. RUUD　　　2,244,922
EYEGLASS CONSTRUCTION
Original Filed March 18, 1938
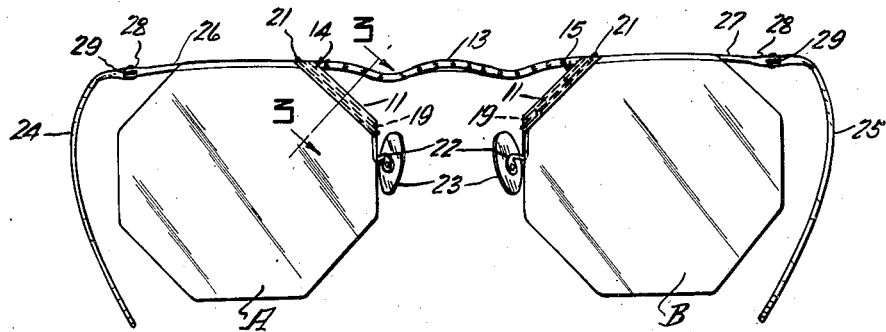
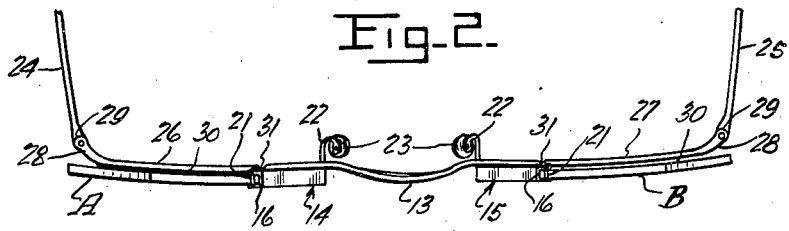
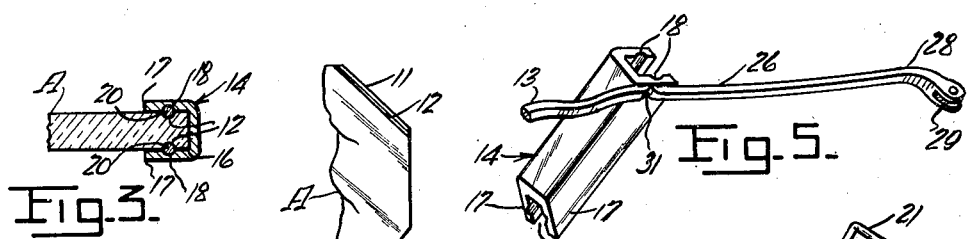
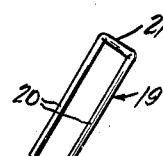
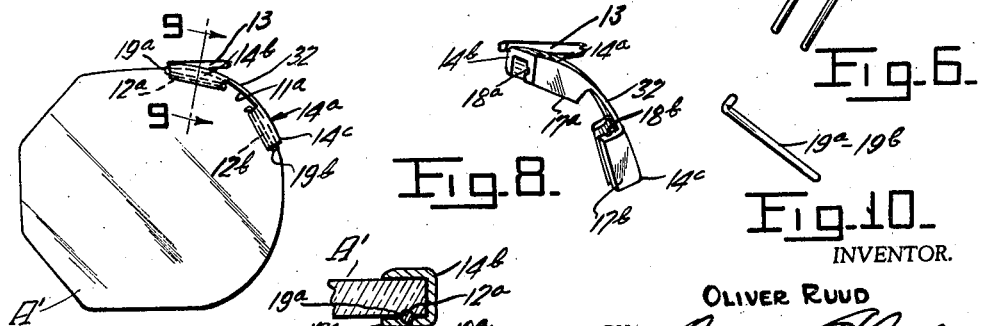
INVENTOR.
OLIVER RUUD
BY Andrew C. Carlsen
ATTORNEY.

Patented June 10, 1941

2,244,922

UNITED STATES PATENT OFFICE 2,244,922

EYEGLASS CONSTRUCTION

Oliver Ruud, Minneapolis, Minn., assignor, by mesne assignments, to Uhlemann Optical Co. of Illinois, Chicago, Ill., a corporation of Delaware Substituted for abandoned application Serial No. 196,674, March 18, 1938. This application May 10, 1939, Serial No. 272,785

4 Claims. (Cl. 88—47)

My invention relates to improvements in eyeglasses.

This application is filed as a substitute for my application Serial No. 196,674, filed March 18, 1938.

A primary object is to provide an assembly in which the lenses may be supported without the use of screws, solder, or similar means, and with the supports at only one edge of the lenses, thus eliminating the difficulty hitherto experienced due to the lenses becoming loosened in their supports and being broken due to strain at opposite ends of the lenses.

Another, and important, object of the invention is to provide a supporting frame structure for eyeglasses wherein the temples or bows are carried directly by the nose piece or bridge, without any connection whatsoever with the outer sides of the lenses, and in which the bridge carries the clips or mounting means which are secured only to the inner lateral edges of the lenses. In this manner the lenses are freed of the usual twisting stress which is placed on them along their horizontal axis due to the usual connection of the bridge and the temples to opposite sides of the lenses. As a result, strains of any kind placed on the temples will be transmitted directly to the bridge and will have no effect on the lenses such as would cause them to be broken.

A further object is to provide a lens mounting in which the lens is grooved adjacent one edge and is fitted into a channel-like clip having complementary, registering grooves whereby a key or pin may be inserted endwise into the grooves to thereby secure the lens against displacement in the clip. Then, upon removing the pin, the lens may be readily slipped edgewise from the clip when desired. This assembly has the distinct advantage over the usual screwless mounting, wherein the clip itself fits into the grooves in the lens, in that the lens need not be worked out of the end of the clip, but may instead be readily removed edgewise from the clip with much less danger of breakage.

The foregoing and other objects and advantages of the invention will be made apparent in the course of the following detailed specification, reference being had to the accompanying drawings, wherein:

Fig. 1 is a frontal elevation of eyeglasses embodying my invention.

Fig. 2 is a plan view thereof.

Fig. 3 is an enlarged fragmental cross section along the line 3—3 in Fig. 1.

Fig. 4 is a fragmental frontal elevation of one lens removed from the frame, and showing the mounting groove therein.

Fig. 5 is an enlarged perspective view of one lens mounting clip, showing one temple support bar and a portion of the bridge.

Fig. 6 is an enlarged perspective view of the key or pin employed in connection with the clip of Fig. 5.

Fig. 7 is a frontal elevation of a single lens showing a modified form of mounting clip thereon.

Fig. 8 is an enlarged perspective view of the clip shown in Fig. 7.

Fig. 9 is an enlarged cross section along the line 9—9 in Fig. 7.

Fig. 10 is an enlarged perspective view of one of the keys or pins used in the clip of Fig. 8.

Referring now with more particularity to the drawings, the reference characters A and B indicate the two lenses of the eyeglasses and these may be of any shape or size desired. Preferably, however, they are formed with their inner and upper corners cut off at an angle as shown at 11 and they are provided with straight grooves 12 extended parallel with these edges 11 on both the frontal and rear faces. The bridge or nose piece 13, which is shaped to fit or extend over the nose of the wearer, is affixed at its laterally turned ends to a pair of lens mounting clips or members 14 and 15 so arranged relative to the bridge that they will stand at the same angle as the edges 11 of the lenses A and B. These clips 14 and 15 are of channel shape, or are U-shaped in cross section, and their channels 16 are turned outwardly to fit over the said edges 11 of the lenses. In this position the walls 17 of the clips 14 and 15 overlie the grooves 12 and the inner sides of these walls are provided with complementary grooves 18 which extend lengthwise of the clips and will register with the aforesaid grooves 12 as clearly shown. U-shaped keys or pins 19 are then provided and have their legs 20 so spaced that they may be inserted endwise down through the registering grooves 12 and 18 at front and rear of the lenses to thereby secure the lenses in the clips. The pins 19 are of such length that they will extend entirely through the grooves and the bights 21 may then be cut off or if retained will come to rest on the upper edges of the lenses to form a finished appearance.

Attention is directed to the fact that the width of the channels 16 is such that they will just nicely receive the edges 11 of the lenses, so that the lenses may be readily inserted edgewise into the open sides of the channels. Then, after the pins 19 are put in place as described, the lenses will be held rigidly against displacement in the clips. To further aid in holding the lenses in place, they may be coated along their edges 11 with a cement of the kind usually employed in this field. This cement may be softened by heating and thus, by removing the pins 19, the lenses may be readily removed from the clips simply by pulling them straightaway from the clips.

The lens mounting thus described supports the lenses rigidly on the bridge 13 and employs no screws for the support. As a result, the lenses will not become loosened and will require no attention from time to time as is the case where screws are used. The use of the separate pins 19 for securing the lenses in the clips is of advantage in that, when these pins are removed, the lenses are entirely freed from the clips and may be removed or replaced without danger of breakage. In the case of prior art mountings of a similar nature and with which I am familiar, the clips themselves are arranged to fit the grooves in the lenses and, as a result, the lenses must be worked endwise out of the clips which very frequently causes them to be broken during this operation.

The lower ends of the clips 14 and 15 carry the curved arms 22 which are fastened to the usual nose rests or pads 23. These arms 22 may be brazed or otherwise secured to the clips as may be desired.

The temples are ordinarily mounted and supported from the outer ends or sides of the lenses so that they may extend straightly back to the ears of the wearer of the eyeglasses. However, this mounting of the temples not only requires lens fittings at the outer sides of the lenses, but what is more important, causes a strain or stress to be placed along the horizontal axes of the lenses whenever the temples are moved or struck in any way. As a result, the lenses are very often broken from this cause.

In accordance with this invention the temples 24 and 25 are supported entirely from the bridge 13, by means of temple bars or support arms 26 and 27 which are secured at their inner ends to the clips 14 and 15 and extend outwardly along, and rearwardly of, the upper margins of the lenses A and B. The free outer ends 28 of these temple bars 26 and 27 are then provided with the usual hinge connections 29 to support the frontal ends of the temples 24 and 25, as shown. It will be noted that the temple bars 26 and 27 clear the lenses A and B a substantial distance 30 in Figure 2, and have no connection whatsoever with the lenses except through the clips 14 and 15. Therefore, the lenses are not, and cannot be, subjected to any twisting or axial strain when the temples are jarred, and the clips 14 and 15 need only support the weight of the lenses themselves. The lenses will thus maintain their proper alignment at all times and will not be readily broken.

The bridge 13 and the temple bars 26 and 27 may be secured to the clips 14 and 15 in any suitable manner, as by brazing as indicated at 31, and it will also be evident that the temple bars may, if desired, be formed as integral extensions of the bridge.

A modified form of lens mounting is shown in Figures 7 through 10, and this is particularly suited to a lens A' having a rounded inner edge 11a. The clip 14a is divided into two channel-shaped sections 14b and 14c which are joined by an arcuated strip 32 and these sections fit nicely over the edge 11a of the lens at spaced points. The lens A' has two straightly extended grooves 12a and 12b in its frontal face adjacent the edge 11a and the clip sections 14b and 14c have complementary grooves 18a and 18b cut in their frontal walls 17a and 17b which will register with the grooves in the lens. Straight pins 19a and 19b are then inserted endwise into the grooves, as shown, to secure the lens in the clip. These pins 19a and 19b may have their ends turned at right angles or upset to hold them in place as will be readily apparent. This form of lens mounting has pins at only one side of the lens but still serves to rigidly hold the lens in place. The bridge 13 and temple supporting bars 26 and 27 may be employed with this form of clip in the manner hereinbefore described.

While I have herein set forth certain preferred embodiments of my invention it is understood that I may vary from the same in details, so as best to provide a practical device for the purposes intended, provided that such variations lie within the scope of the appended claims.

Having thus fully disclosed my invention, what I claim as new and desire to secure by Letters Patent is:

1. An ophthalmic lens having an elongated facial groove adjacent an edge thereof extending along the face of the lens, a clip adjacent an edge of the lens having a securing portion provided with an elongated groove opposite and registering with the elongated groove in the lens, and a longitudinally movable retaining pin lying in said elongated grooves, the said grooves having entrance openings large enough to enable the endwise insertion of the pin into the groove when the clip is in position on the lens.

2. An ophthalmic lens having an elongated facial groove adjacent an edge thereof extending along the face of the lens, a clip adjacent an edge of the lens having portions embracing an edge portion of the lens and provided with an elongated groove opposite and registering with the elongated groove in the lens, and a longitudinally movable retaining pin lying in said elongated grooves, the said grooves having entrance openings large enough to enable the endwise insertion of the pin into the groove when the clip is in position on the lens.

3. An ophthalmic lens having elongated facial grooves adjacent an edge thereof extending along the face of the lens, said grooves extending at an oblique angle to each other, mounting means adjacent an edge of the lens having securing portions provided with elongated grooves opposite and registering with the elongated grooves in the lens, and elongated removable retaining pins lying in said elongated grooves, the said grooves having entrance openings large enough to enable the endwise insertion of the pin into the groove when the securing portions are in position on the lens.

4. An ophthalmic lens having elongated facial grooves adjacent an edge thereof extending along the face of the lens, said grooves extending non-parallel to each other, mounting means adjacent an edge of the lens having securing portions provided with elongated grooves opposite and registering with the elongated grooves in the lens, and elongated removable retaining pins lying in said elongated grooves, the said grooves having entrance openings large enough to enable the endwise insertion of the pin into the groove when the securing portions are in position on the lens.

OLIVER RUUD.